United States Patent [19]

Bohringer

[11] 4,227,125

[45] Oct. 7, 1980

[54] REGULATED DEFLECTION SYSTEM

[75] Inventor: Walter Bohringer, Schlieren, Switzerland

[73] Assignee: RCA Corporation, New York, N.Y.

[21] Appl. No.: 18,361

[22] Filed: Mar. 7, 1979

[30] Foreign Application Priority Data

Sep. 26, 1978 [GB] United Kingdom ............... 38145/78

[51] Int. Cl.² .............................................. H01J 29/70
[52] U.S. Cl. ..................................................... 315/411
[58] Field of Search ........................................ 315/411

[56] References Cited

U.S. PATENT DOCUMENTS

| | | | |
|---|---|---|---|
| 3,970,780 | 7/1976 | Minoura | 315/411 X |
| 3,999,102 | 12/1976 | Gent et al. | 315/410 |
| 4,028,589 | 6/1977 | Verbeig | 315/408 |
| 4,034,262 | 7/1977 | Dietz | 315/408 |
| 4,037,137 | 7/1977 | Dietz | 315/408 X |
| 4,071,810 | 1/1978 | Dobbert | 315/408 X |
| 4,079,295 | 3/1978 | den Hollander | 315/411 |
| 4,176,304 | 11/1979 | Scott | 315/411 |

FOREIGN PATENT DOCUMENTS

2027840 12/1971 Fed. Rep. of Germany .

OTHER PUBLICATIONS

Valvo Note, Apr. 15, 1975, "Thyristor H-Deflection Circuit With Network Isolation".

Primary Examiner—Malcolm F. Hubler
Attorney, Agent, or Firm—Eugene M. Whitacre; Paul J. Rasmussen; Joseph J. Laks

[57] ABSTRACT

The trace switch of a horizontal deflection circuit is coupled to a secondary winding of a flyback transformer. The primary winding is coupled to a source of energy and a regulator switch. A control circuit varies the phase angle of the regulator switch in accordance with an energy level of the deflection circuit. A regulator commutating inductance in combination with a commutating and tuning capacitance controls the duration of conduction of the regulator switch. The capacitance independently tunes with a flyback transformer winding to transfer energy from the source in a resonant manner.

7 Claims, 7 Drawing Figures

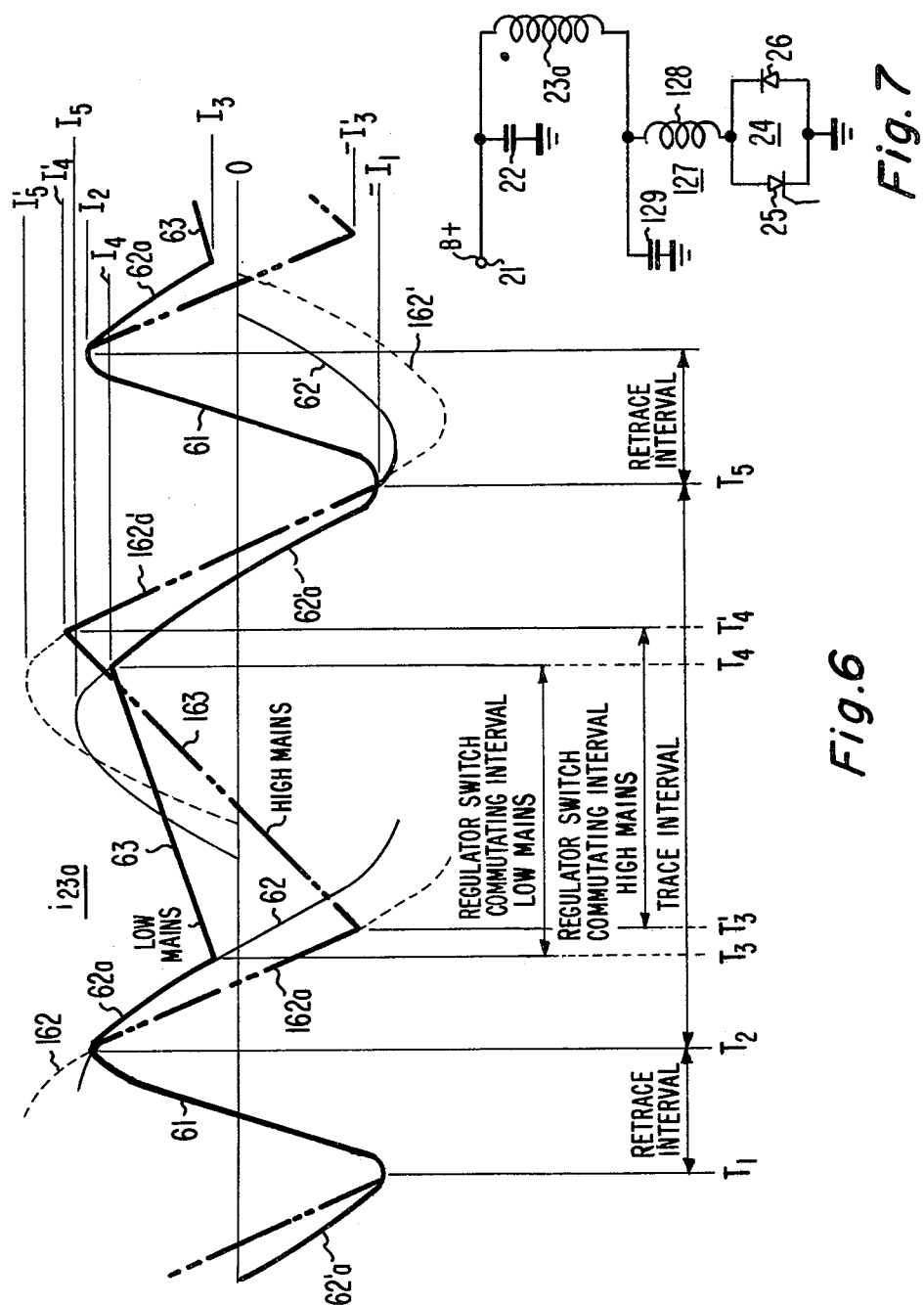

REGULATED DEFLECTION SYSTEM

BACKGROUND OF THE INVENTION

This invention relates to voltage regulators such as used with television deflection circuits.

Circuit arrangements frequently used in television receivers combine switched mode power supplies (SMPS) with transistor horizontal deflection. Various types of SMPS circuits have been used; many have a common feature of providing a regulated DC supply to the horizontal deflection circuit. The horizontal deflection circuit, however, draws an AC current from the power supply. By avoiding the necessity of providing a regulated DC input voltage, a substantial saving in circuit costs and a substantial increase in circuit efficiency may be obtained.

Conventional switched mode transformers for television receiver application are of the flyback or backwards converter type, require a relatively close coupling, have critical tolerances, and are relatively expensive to manufacture. In a commonly used switched mode system using a backwards converter with transistor regulator switch, the AC voltage at the secondary side of the switched mode transformer is rectified and filtered by a capacitor. The DC voltage across the filter capacitor provides the input supply voltage for the horizontal output stage. It would be desirable to omit such a separate rectifying step.

Other regulator circuits include a flyback transformer primary winding coupled to a regulator switch, the horizontal deflection winding, retrace capacitor, and trace switch being coupled to a flyback secondary winding. A capacitor tunes with the flyback transformer for energy transfer to the deflection circuit. In such circuits, however, the conduction time of the regulator switch cannot be selected independent of the tuning requirements for the flyback transformer.

SUMMARY OF THE INVENTION

A transformer includes first and second windings. A trace switch of a deflection circuit is coupled to the second winding and to a deflection winding. The first winding is coupled to a source of energy and a regulator switch. The regulator switch's phase angle is controlled by a control circuit that is responsive to an energy level of the deflection circuit. A tuning capacitance is coupled to the transformer for transferring energy from the source in a resonant manner. The capacitance in combination with a commutating inductance controls the duration of conduction of the regulator switch.

BRIEF DESCRIPTION OF THE DRAWING

FIG. 6 illustrates still other waveforms associated with the circuit of FIG. 1; and FIG. 7 illustrates a portion of the circuit of FIG. 1 with a different arrangement of a regulator switch commutating circuit.

DESCRIPTION OF THE INVENTION

Figure 1:
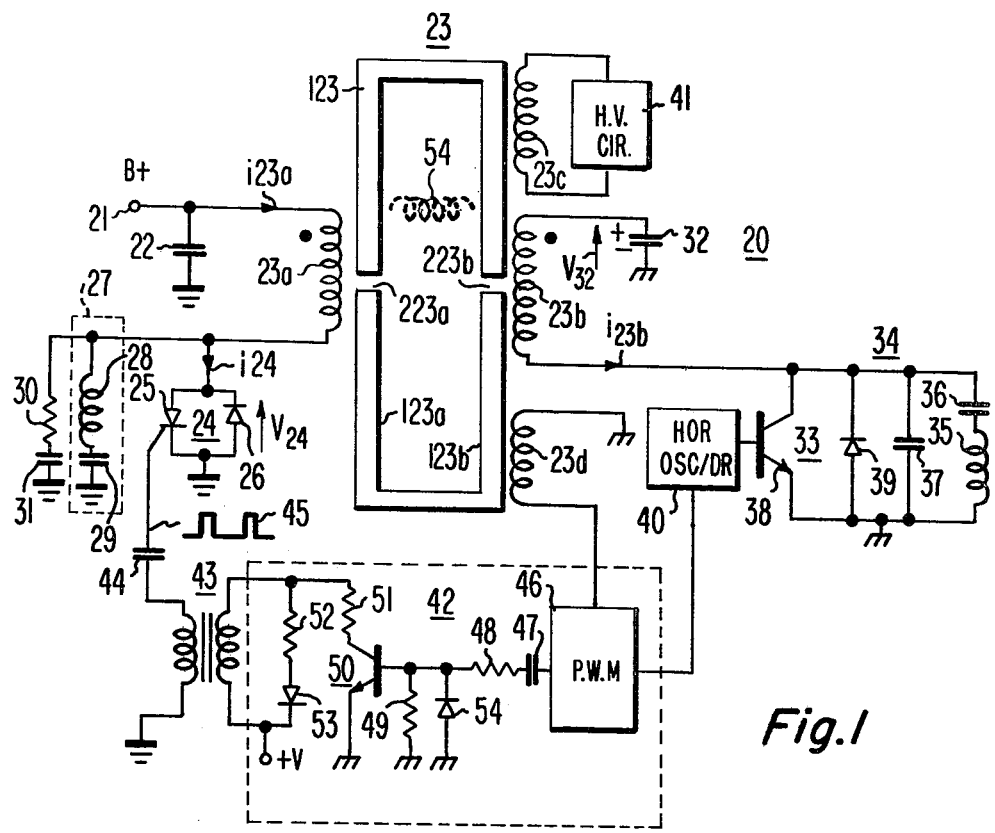
FIG. 1 illustrates a regulated deflection circuit embodying the invention.

In the regulated horizontal deflection circuit 20, illustrated in FIG. 1, AC line mains voltage, not shown, of a value 220 VAC, for example, is full-wave rectified and coupled to an unregulated B+ supply voltage input terminal 21, and is filtered by a capacitor 22. Input terminal 21 is coupled to a primary winding 23a of a horizontal output or flyback transformer 23. A bidirectionally conductive regulator switch 24 comprising for example, an ITR, or for example, a silicon controlled rectifier SCR 25 and a parallel oppositely poled diode 26 is coupled to primary winding 23a. A regulator switch commutating circuit 27 for commutating off regulator switch 24 is coupled across regulator switch 24 and comprises a series coupled inductor 28 and capacitor 29. A damping network comprising a resistor 30 and a capacitor 31 is also coupled across regulator switch 24. Other switching arrangements such as transistor switches may be substituted for the ITR of switch 24.

Primary winding 23a is wound on a leg 123a of a rectangular core 123 of horizontal output transformer 23. Wound on an opposite leg 123b is a secondary winding 23b. Air gaps 223a and 223b are formed in respective legs 123a and 123b.

One terminal of secondary winding 23b is coupled to a capacitor 32. Another terminal of winding 23b is coupled to a horizontal trace switch 33 of a horizontal output stage 34. Horizontal output stage 34 comprises a series-coupled horizontal deflection winding 35 and a trace capacitor 36, a retrace capacitor 37 and a trace switch 33, which itself is comprised of a horizontal output transistor 38 and a damper diode 39. A conventional horizontal oscillator and driver circuit 40 couples scan synchronized horizontal rate switching signals to the base or control electrode of horizontal output transistor 38 to turn on the transistor during the horizontal trace interval and to turn off the transistor to initiate the horizontal retrace interval.

A high voltage winding 23c of horizontal output transformer 23 is coupled to a conventional high voltage circuit 41 for developing a beam current ultor voltage. Although high voltage winding 23c and winding 23b are illustrated in FIG. 1 as being adjacent each other on core 123b, in order to provide tight magnetic coupling between the two windings, high voltage winding 23c is wound over winding 23b. Other horizontal output transformer windings, not shown, may provide utility pulses for such functions as horizontal blanking and may also provide secondary supply voltages for use by such circuits as the vertical, audio, and video processing circuits. Isolation of horizontal deflection circuit 20 and the other load circuits of transformer 23 from the AC line mains supply is provided by transformer 23.

To provide for regulation of horizontal deflection circuit 20, a regulator control circuit 42 couples horizontal rate turn-on gating signals 45 to the gate of SCR 25 of regulator switch 24 through a coupling transformer 43 and a capacitor 44. Horizontal rate pulse-width modulated signals are obtained from a conventional pulse-width modulator 46 such as a Texas Instrument SN74121, Texas Instruments, Dallas, Tex., or a Philips TDA2640, Philips Gloeilampenfabrieken, Eindhoven, Netherlands. The width of the pulses are modulated in accordance with an energy level of horizontal deflection circuit 20. The energy level selected is the horizontal retrace pulse amplitude obtained from a winding 23d of horizontal output transformer 23. Horizontal rate scan synchronizing signals are coupled to modulator 46 from horizontal oscillator and driver 40.

The pulse width modulated signals from modulator 46 are differentiated by a capacitor 47 and resistors 48 and 49 and are coupled to the base of a pulse squaring transistor 50, the base being coupled to the junction of resistors 48 and 49. The collector of transistor 50 is coupled to one terminal of the primary winding of coupling transformer 43 through a resistor 51. Another terminal of transformer 43 is coupled to a +V supply. Transistor 50 converts the differentiated pulse width modulated signals from modulator 46 into the pulse position modulated gating signals 45. A diode 54 removes the negative portions of the differentiated pulse width modulated signals and a resistor 52 and a diode 53 damp transients developed across the primary winding of coupling transformer 43.

The voltage $V_{33}$ across trace switch 33 is illustrated in FIG. 2a and equals approximately zero during the trace interval between times $t_1$-$t_4$ and a retrace pulse between times $t_4$-$t_5$. At a controlled instant $t_2$ within the first portion of the horizontal trace interval, regulator control circuit 42 provides a gating signal 45 to SCR 25 and turns on regulator switch 24. The input current $i_{23a}$ flowing in primary winding 23a of horizontal output transformer 23 begins to linearly increase from time $t_2$, as illustrated in FIG. 2b. At time $t_2$, a sinusoidal commutating current $i_{24}$, obtained from regulator commutating circuit 27, begins to flow in regulator switch 24, as illustrated in FIG. 2d by the current $i_{24}$ and by FIG. 2e, the voltage $V_{24}$ across switch 24. After approximately one complete cycle of oscillation of current $i_{24}$, regulator switch 24 is commutated off at time $t_3$, still within the trace interval, at which time primary winding current $i_{23a}$ begins to decrease.

With primary winding 23a and secondary winding 23b wound on opposite legs of core 123, a substantial leakage inductance 54 exists between the two windings, on the order of 2.3 millihenries, for example. The current $i_{23b}$ flowing in deflection-coupled secondary winding 23b and in capacitor 32 is illustrated in FIG. 2c. The voltage across secondary winding 23b is rectified by trace switch 33 during the start-up interval and charges capacitor 32 to an average DC voltage which is the DC value of retrace pulse voltage $V_{33}$. Capacitor 32 blocks the DC short-circuit path from winding 23b. During steady-state operation, the average voltage across capacitor 32 equals the average value of retrace pulse voltage $V_{33}$.

Figure 3:
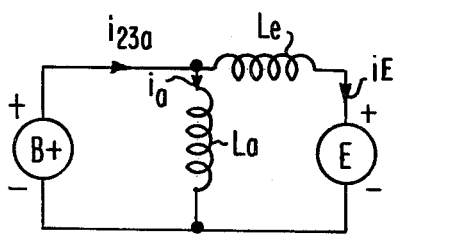
FIGS. 3-5 illustrates equivalent circuits in the operation of the circuit of FIG. 1.
Figure 2:
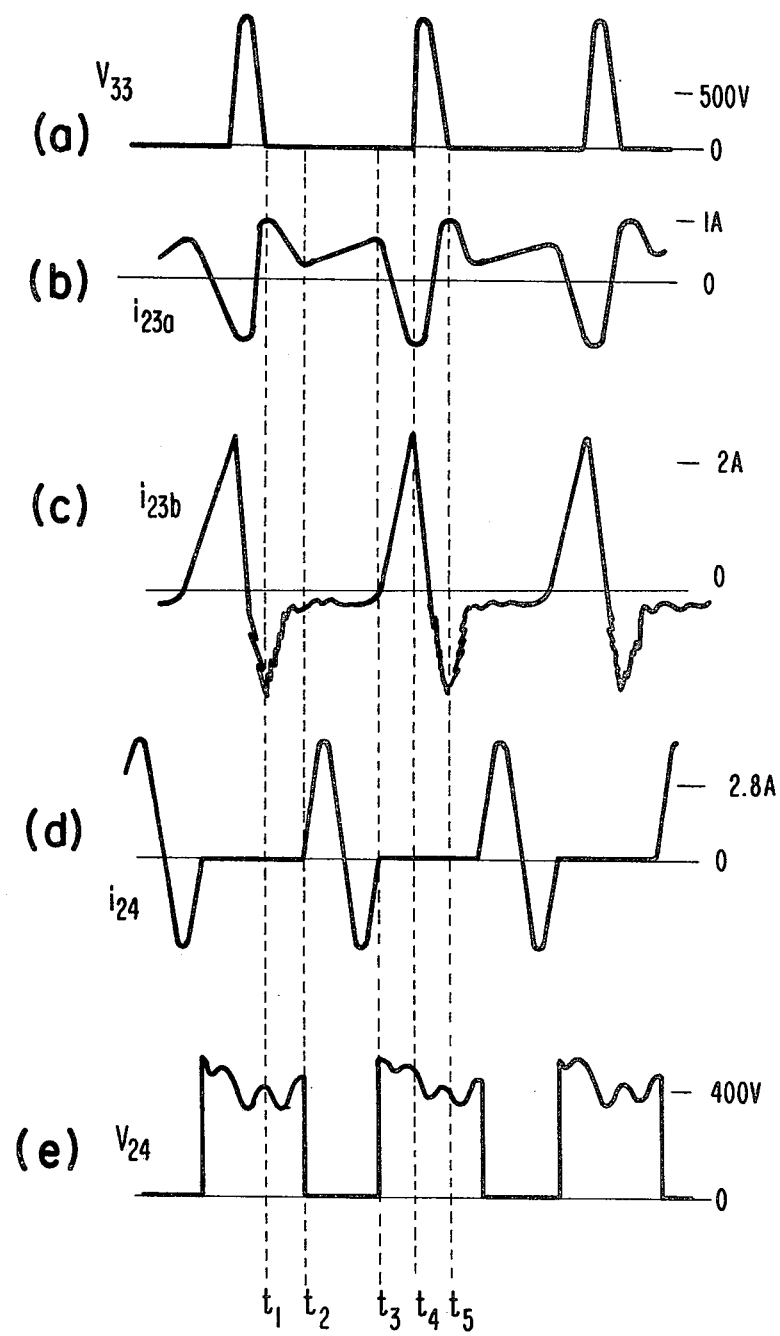
FIG. 2 illustrates waveforms associated with the circuit of FIG. 1.

With regulator switch 24 and trace switch 33 conducting during the middle portion of trace between times $t_2$-$t_3$ of FIG. 2, a simplified equivalent circuit for the circuit of FIG. 1 is illustrated in FIG. 3, assuming, for example, a one-to-one transformation ratio between primary winding 23a and secondary winding 23b of flyback transformer 23. $L_a$ represents the inductance of winding 23a and $L_e$ represents the leakage inductance 54. The B+ supply voltage is coupled across $L_a$. Because capacitor 32 is relatively large valued, and because the interval when both switches 24 and 33 are conducting is relatively short, capacitor 32 has been replaced in the equivalent circuit by a DC voltage source E equal in magnitude to the average voltage across capacitor 32.

The current $i_a$ through $L_a$ and the current $i_E$ through $L_e$ are each linearly increasing with slopes respectively depending on the B+ voltage and the voltage difference between B+ and E. The algebraic sum of these two currents equals the input current $i_{23a}$. The current $i_E$ through $L_e$ equals the secondary winding current $i_{23b}$.

During the beginning and ending portion of the trace interval between times $t_1$-$t_2$ and $t_3$-$t_4$, regulator switch 24 is nonconducting whereas trace switch 33 is still conducting. The simplified equivalent circuit for these conditions is illustrated in FIG. 4, where $C_{29}$ equals the capacitance of capacitor 29 of regulator switch commutating circuit 27 and $L_{28}$ equals the inductance of inductor 28.

Figure 4:
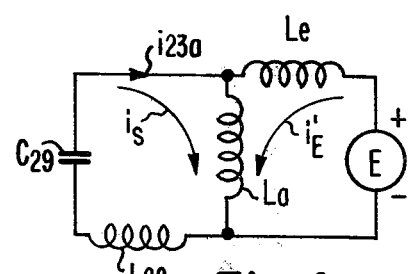

A sinusoidal loop current $i_s$ flows in the circuit of FIG. 4, with a frequency defined by the series coupling of $C_{29}$, $L_{28}$, and the parallel arrangement of $L_a$ and $L_e$. Also flowing is the sawtooth loop current $i_E'$. The input current $i_{23a}$ is the algebraic sum of the currents through $L_a$ and $L_e$ and thus equals only the sinusoidal current $i_s$. The current $i_{23b}$ through flyback secondary winding 23b is the algebraic sum of the input current $i_{23a}$ multiplied by $L_e/L_a$ and the sawtooth current $i_E'$.

Figure 5:
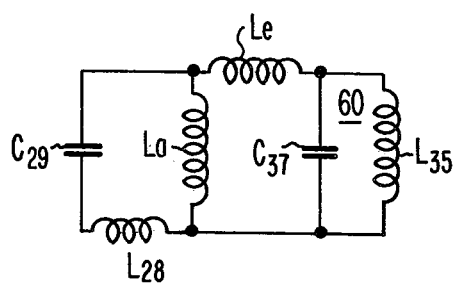

During retrace, the simplified equivalent circuit for FIG. 1 is illustrated in FIG. 5, where $L_{35}$ equals the inductance of deflection winding 35 and $C_{37}$ equals the capacitance of retrace capacitor 37. Because the B+ voltage source and storage capacitor 32 are effectively in series with $C_{29}$ and $C_{37}$ respectively, they have been omitted. Similarly, because of its relatively large value, capacitor 36 has also been omitted. The current through $L_e$ equals $i_{23b}$ and functions to replenish load-derived losses occurring in the resonant retrace circuit 60 comprising $L_{35}$ and $C_{37}$. This current comprises the superpositions of several sinewave frequencies, with the highest and most significant frequency typically being the resonant retrace frequency. Another component to $i_{23b}$ comprises a DC load current component.

The inductances $L_a$ and $L_e$ are typically substantially larger than the inductance $L_{35}$ of horizontal deflection winding 35. The input current $i_{23a}$ will therefore be proportional to $i_{23b}$ during retrace and will ideally be a portion of a sinewave 61 between times $T_1$-$T_2$, as illustrated in the idealized waveforms of FIG. 6, with a peak magnitude of $I_1$ at the beginning of retrace at time $T_1$ and a peak magnitude of $I_2$ at the end of retrace at time $T_2$. Although shown to be equal, magnitudes $I_1$ and $I_2$ will differ as a function of retrace loading.

From time $T_2$ of FIG. 6, the beginning of the trace interval, until time $T_3$, the beginning of the regulator switch 24 commutating interval, the input current decreases in a sinusoidal manner to a magnitude $I_3$, as illustrated by the heavy solid line portion 62a of the sinusoidal waveform 62. The frequency of sinewave 62 is determined by the equivalent circuit illustrated in FIG. 4 when regulator switch 24 is nonconductive and trace switch 33 is conductive. Switch 24 becomes conductive at time $T_3$ in response to a gating signal 45 coupled to SCR 25 from control circuit 42, the instant $T_3$ of FIG. 6 being illustratively the turn-on instant for low AC mains voltage. Regulator switch 24 is conductive for the interval $T_3$-$T_4$ and input current $i_{23a}$ equals a positive going sawtooth current 63, reaching a peak magnitude $I_4$ at time $T_4$. At time $T_4$, regulator switch commutating circuit 27 commutates off regulator switch 24.

The equivalent circuit between time $T_4$ and time $T_5$ the beginning of the next retrace interval is again that illustrated in FIG. 4, because, between times $T_4$-$T_5$, regulator switch 24 is nonconductive whereas trace switch 33 is still conductive. Input current $i_{23a}$ is thusly a sinewave portion 62a' of a sinusoidal waveform 62'.

Sinusoidal waveforms 62 and 62' are of the same frequency because they are both reepresented by the same equivalent circuit of FIG. 4. Input current $i_{23a}$, however, differs in value at times $T_2$ and $T_4$, the beginning instants for which the equivalent circuit of FIG. 4 is a valid representation. Because the initial current conditions differ, the phases and amplitudes of the two waveforms 62 and 62' also differ.

At time $T_5$, the beginning of retrace, input current $i_{23a}$ has returned to the value of $-I_1$, thereby beginning a new cycle of operation. Assuming constant load conditions, to provide both a relatively constant high voltage and a constant peak-to-peak scan current in horizontal deflection winding 35, input current $i_{23a}$ is maintained at a constant magnitude $I_1$ at the beginning of retrace, at times $T_1$ and $T_5$, With $I_1$ maintained constant, the input current at the end of retrace reaches the amplitude $I_2$, regardless of the AC mains variations.

For high AC mains voltage, during the first portion of trace, beginning at time $T_2$, when the equivalent circuit of FIG. 4 is operative, input current $i_{23a}$ follows the sinusoidal portion 162a of a sinusoidal waveform 162, as illustrated by the heavy dotted waveform of FIG. 6 between times $T_2$-$T_3'$. Waveform 162, illustrating high AC mains conditions is of the same frequency as waveform 62, illustrating low AC mains conditions. The slope of waveform portion 162a, however, is steeper than the slope of portion 62 because sinewave 162 has a higher amplitude than sinewave 62 due to the total energy in the circuit being greater at high AC mains voltage than at low AC mains voltage.

Thus, at the later time $T_3'$, the instant when regulator switch 24 is made conductive for high AC mains conditions, input current $i_{23a}$ has decreased to a negative value $-I_3'$ when compared to the positive value $+I_3$ for low AC mains conditions.

Between times $T_3'$-$T_4'$, the regulator switch 24 commutating interval, input current $i_{23a}$ equals a sawtooth current 163. Because the B+ voltage is greater for high AC mains conditions, the slope of sawtooth current 163 is greater than the slope of sawtooth current 63. The magnitude of input current at the end of the regulator switch commutating interval for high AC mains voltage at time $T_4'$ is $I_4'$ and is greater than the magnitude $I_4$ at time $T_4$ for low AC mains voltage.

Between time $T_4'$ and time $T_5$, the beginning of the next retrace, the equivalent circuit is again that of FIG. 4. Input current $I_{23a}$ equals a sinusoidal portion 162a' of a sinusoidal waveform 162', as illustrated by the heavy dotted waveform between times $T_4'$ and $T_5$.

The frequencies of sinusoidal waveforms 62' and 162' are the same since they are both represented by the equivalent circuit of FIG. 4. Because, however, for high AC mains voltage, the initial input current magnitude of $I_4'$ at the later time $T_4'$ is greater than the initial magnitude of $I_4$ at the earlier time $T_4$, for low AC mains voltage, the slope of waveform 162a' is greater than the slope of waveform 62a'. Therefore, regardless of the AC mains voltage variations, the input current magnitude at the beginning of retrace is a constant $I_1$ for constant load conditions, as is required to achieve high voltage regulation.

With the regulator switch 24 commutating interval $T_3$-$T_4$ or $T_3'$-$T_4'$ substantially of fixed duration, as determined by the fixed resonant frequency of regulator switch commutating circuit 27, regulation for AC mains voltage variations is achieved by varying the turn-on instant of regulator switch 24. The turn-on instant of regulator switch 24 is similarly varied with load current variations.

At a constant B+ voltage, the magnitude $I_1$ of the input current $i_{23a}$, at the beginning of retrace, would decrease with increased loading by high voltage circuit 41 if the turn-on instant were to remain unchanged. This decrease in $I_1$ with increased load current would cause both the high voltage and horizontal scanning or deflection current amplitude to decrease thereby providing a measure of picture width stability. However, to minimize the high voltage circuit impedance, it may be desirable to maintain a relatively constant magnitude $I_1$ with load current variations. Thus, by advancing the turn-on instant within trace of regulator switch 24, the magnitude $I_1$ is maintained relatively constant despite load current increases.

FIG. 7 illustrates a portion of the circuit of FIG. 1 that includes a different arrangement for a regulator switch commutating circuit 127 than that of commutating circuit 27 of FIG. 1. An inductor 128 of commutating circuit 127 is coupled between flyback winding 23a and regulator switch 24. A capacitor 129 is coupled between ground and the junction of inductor 128 and winding 23a. The function and operation of regulator switch commutating circuit 127 is similar to that described previously for circuit 27.

An advantage of the arrangement of FIG. 7 is that inductor 128 is only coupled in the transformer circuit during the regulator commutating interval. Using the regulator commutating circuit 27 of FIG. 1, a change in inductance value changes both the regulator commutating interval duration and also changes the tuning of the transformer during the remainder of the deflection cycle. With the arrangement of FIG. 7, the value of inductor 128 may be changed without affecting circuit operation during the regulator switch off-time.

Another advantage of the arrangement of FIG. 7 is that input current $i_{23a}$ during the regulator commutating interval includes a sinewave component thereby reducing RFI radiation. Furthermore, with inductor 128 in series with regulator switch 24, the di/dt of the switch current during switch turn-on is reduced, thereby further reducing RFI radiation.

In either arrangement, the regulator commutating circuit capacitor performs a dual function. The capacitor combined with the regulator commutating inductor establishes the regulator commutating interval or the duration of conduction of regulator switch 24. The regulator capacitor also independently functions to tune with the flyback transformer inductances La and Le to transfer energy from the B+ voltage source in a resonant manner. Regulation as well as circuit efficiency is improved. The effective high voltage impedance is minimized.

By varying the on-time of regulator switch 24 within trace and keeping the regulator switch nonconductive during retrace, the high voltage and deflection current amplitudes are relatively easily regulated. Because a separate commutating inductance, other than one of the flyback transformer associated inductances, is used in conjunction with the regulator capacitor, the duration of the commutating interval of the regulator switch may be selected substantially independently of the tuning requirements of the flyback transformer. Improved regulation and efficiency results. Typically, the commutating interval duration is selected at approximately one-half the trace interval duration.

Selected FIG. 1 circuit values and component descriptions are given below.

B+ voltage:
285 volts, nominal
Capacitor:
22: 400 microfarad
29: 68 nanofarad
31: 1 nanofarad
32: 3.3 microfarad
36: 1.2 microfarad
37: 11.5 nanofarad
Resistor 30:
1.2 kilohm
Inductor 28:
350 microhenry
Deflection Winding 35:
1.1 millihenry
1.2 ohms
$L_a$: 4.9 millihenry
$L_c$: 2.3 millihenry
Flyback Transformer 23:
Core: UU59 3c8 material from Philips Gloeilampenfabrieken
Air gaps: 0.3 millimeter, each leg
Winding 23a: 100 turns 10×0.15 m.m. Litz wire
Winding 23b: 119 turns 0.5 m.m. enameled copper wire
Winding 23c: 818 turns 0.1 m.m. enameled copper wire
Winding 23d: 6 turns 0.5 m.m. enameled copper wire

What is claimed is:

1. A regulated deflection system, comprising:
   a source of unregulated energy;
   a regulator switch;
   a first winding of a transformer coupled to said source of unregulated energy and to said regulator switch;
   a deflection winding;
   a trace switch coupled to said deflection winding for developing scanning current in said deflection winding;
   a second winding of said transformer coupled to at least one of said deflection winding and said trace switch for transferring energy from said source;
   control means coupled to said regulator switch and responsive to an energy level of said deflection system for varying the conduction phase angle of said regulator switch for regulating the amount of energy transferred from said source;
   a regulator commutating inductance coupled to said regulator switch; and
   a commutating and tuning capacitance coupled to said regulator commutating inductance and to an associated winding of said transformer, said capacitance tuning with said associated winding of said transformer for transferring energy from said source in a resonant manner, said capacitance forming a resonant regulator commutating circuit for controlling the duration of conduction of said regulator switch.

2. A system according to claim 1 wherein said resonant regulator commutating circuit commutates off said regulator switch.

3. A system according to claim 2 wherein the conduction interval of said regulator commutating switch occurs entirely within a trace interval of a deflection cycle of said scanning current.

4. A system according to claim 3 wherein said first and second windings are magnetically decoupled by the leakage inductance of said transformer.

5. A system according to claim 4 including a high voltage winding for generating an ultor accelerating potential, said high voltage winding magnetically closely coupled with said second winding.

6. A system according to claim 5 wherein said resonant regulator commutating circuit is coupled in parallel with said regulator switch.

7. A system according to claim 5 wherein said regulator commutating inductance is coupled in series with said regulator switch.

* * * * *